Sept. 3, 1929.  F. OLSON  1,726,758
FILTERING MACHINE
Filed March 18, 1927   4 Sheets-Sheet 2
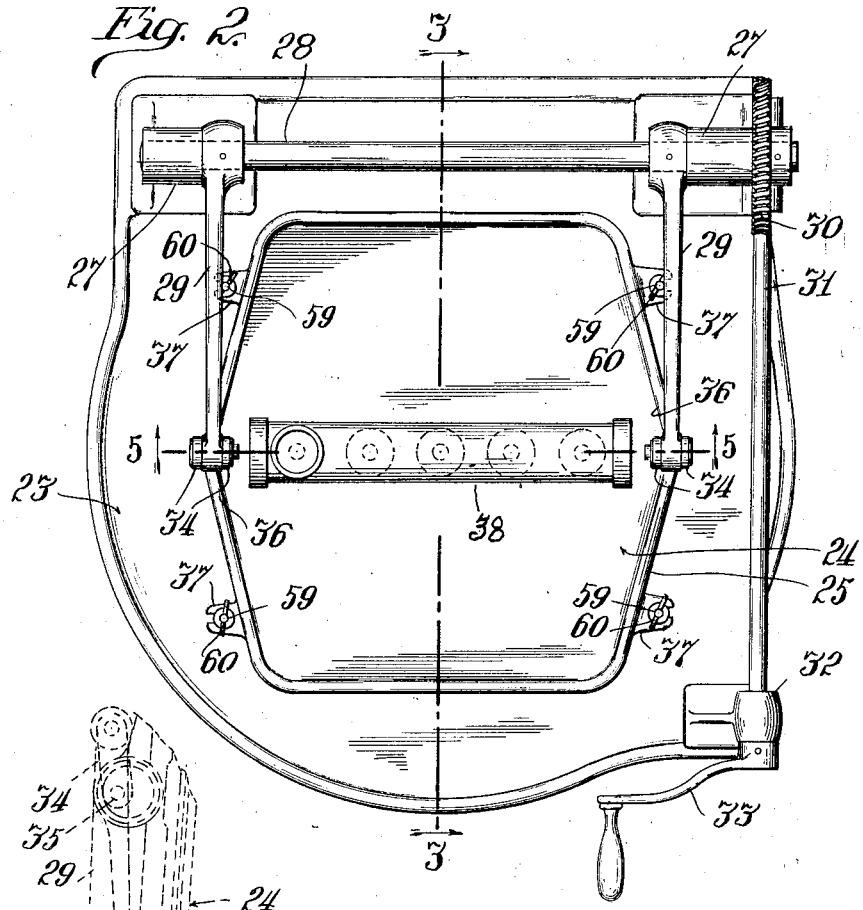
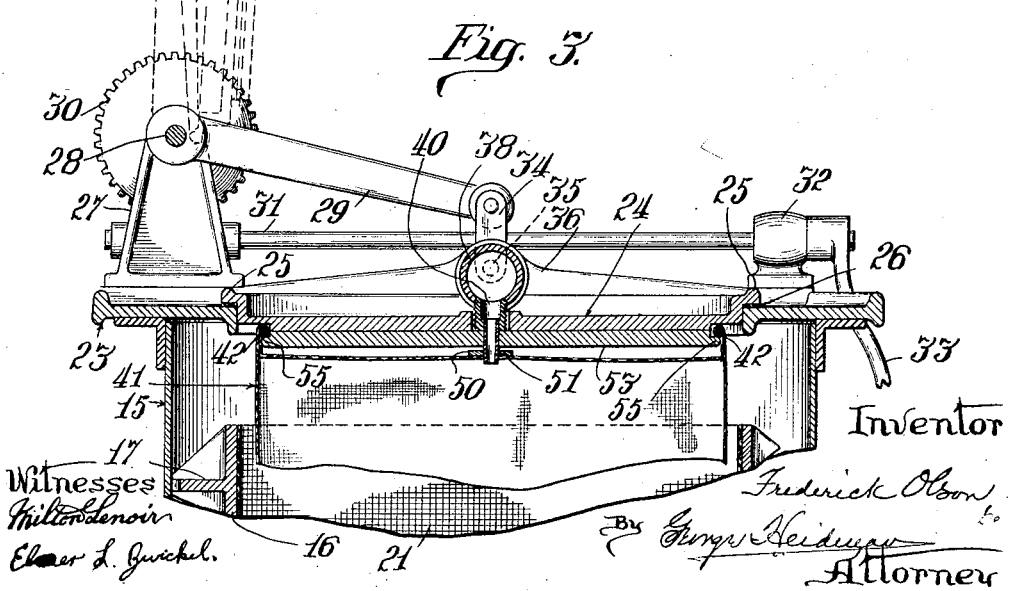

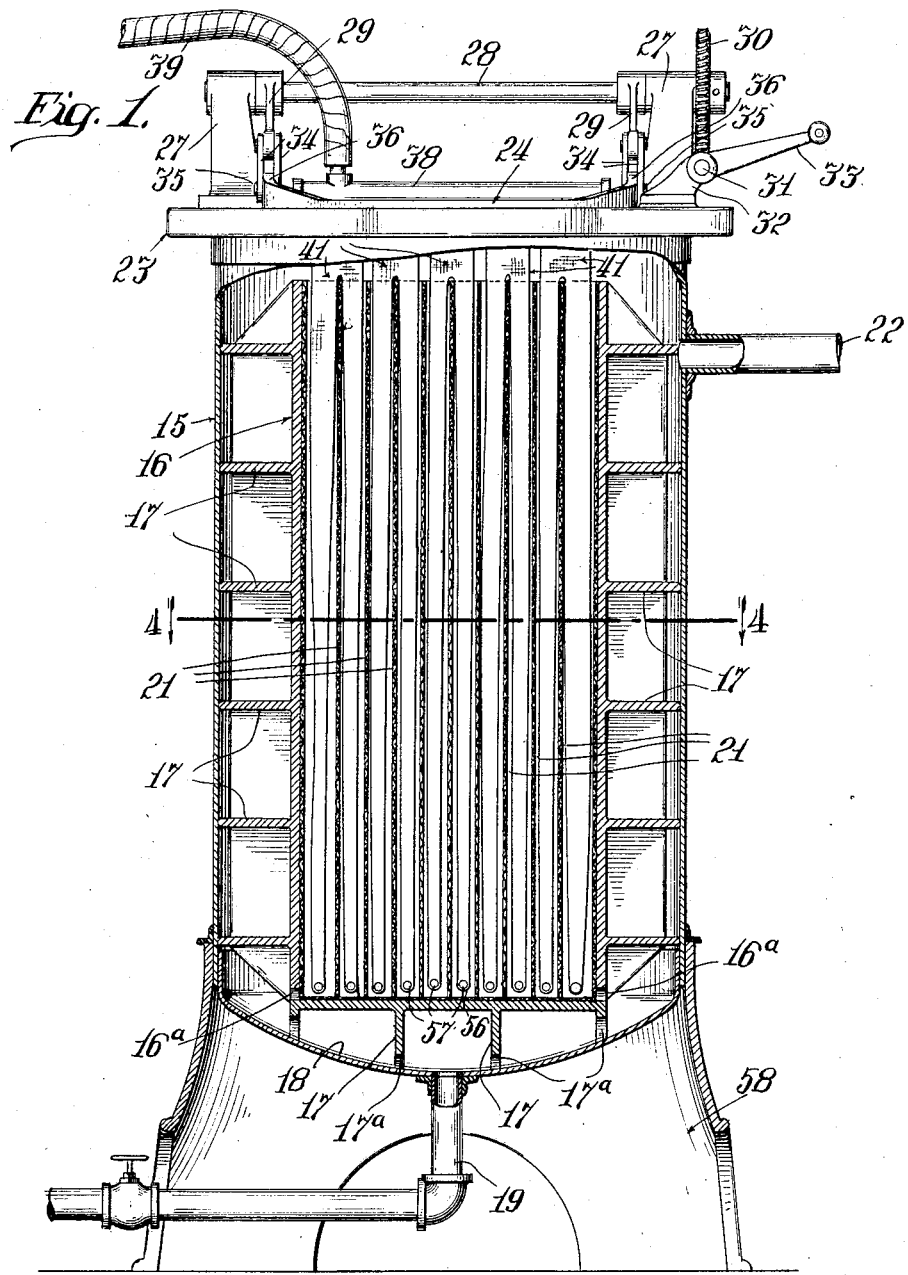

Sept. 3, 1929. F. OLSON 1,726,758
FILTERING MACHINE
Filed March 18, 1927 4 Sheets-Sheet 3
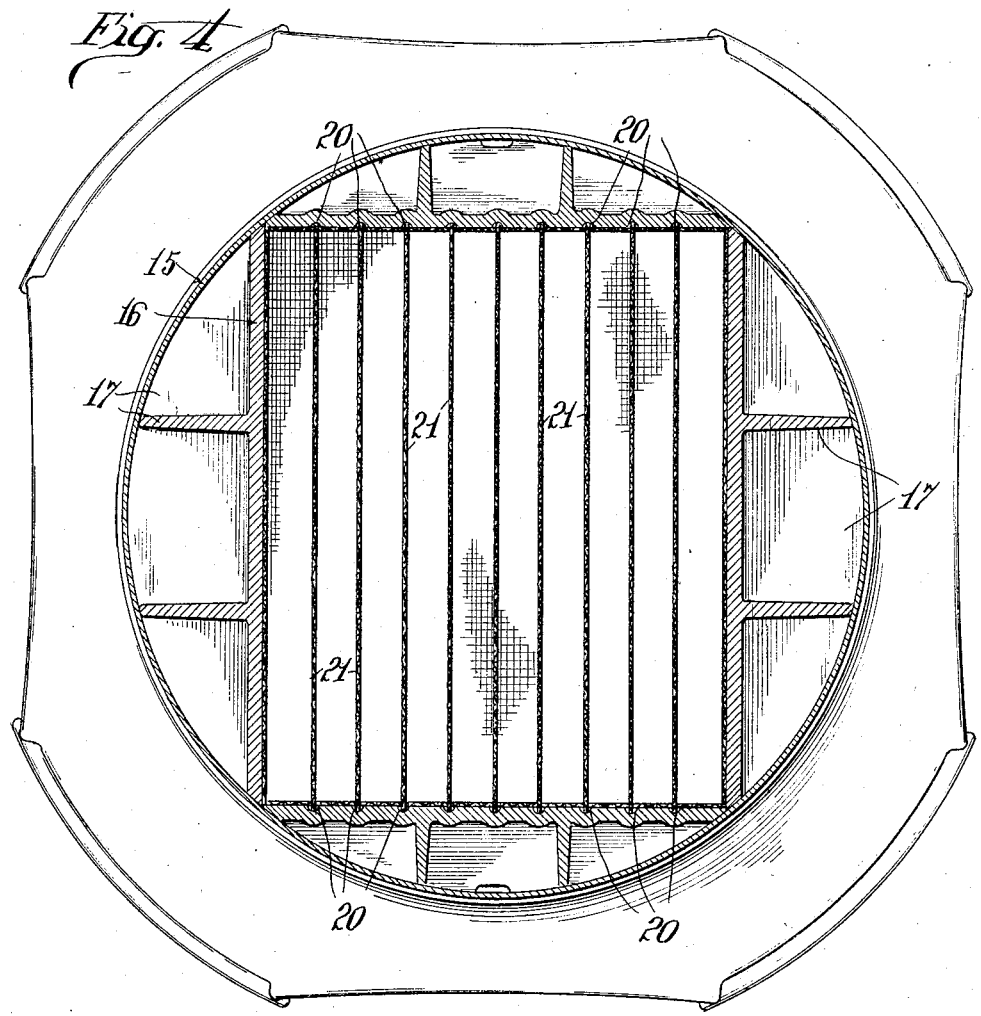
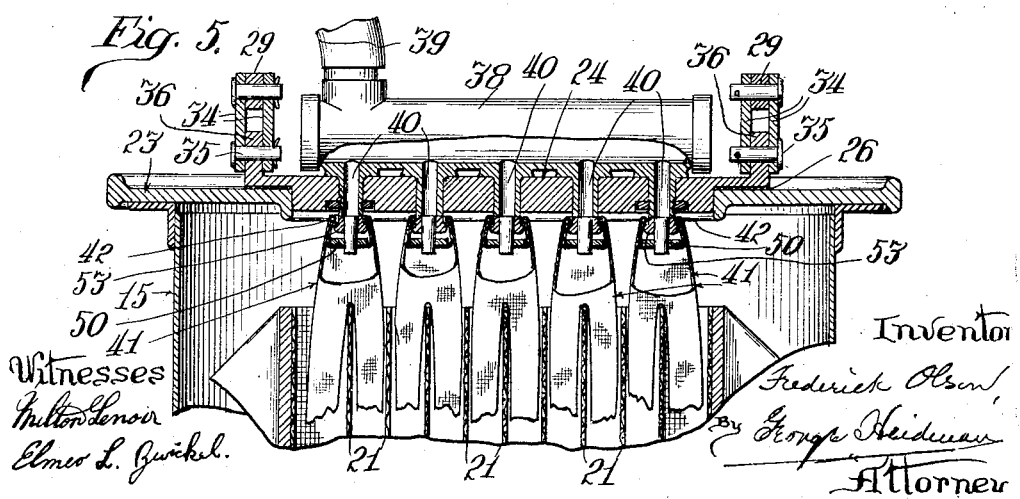

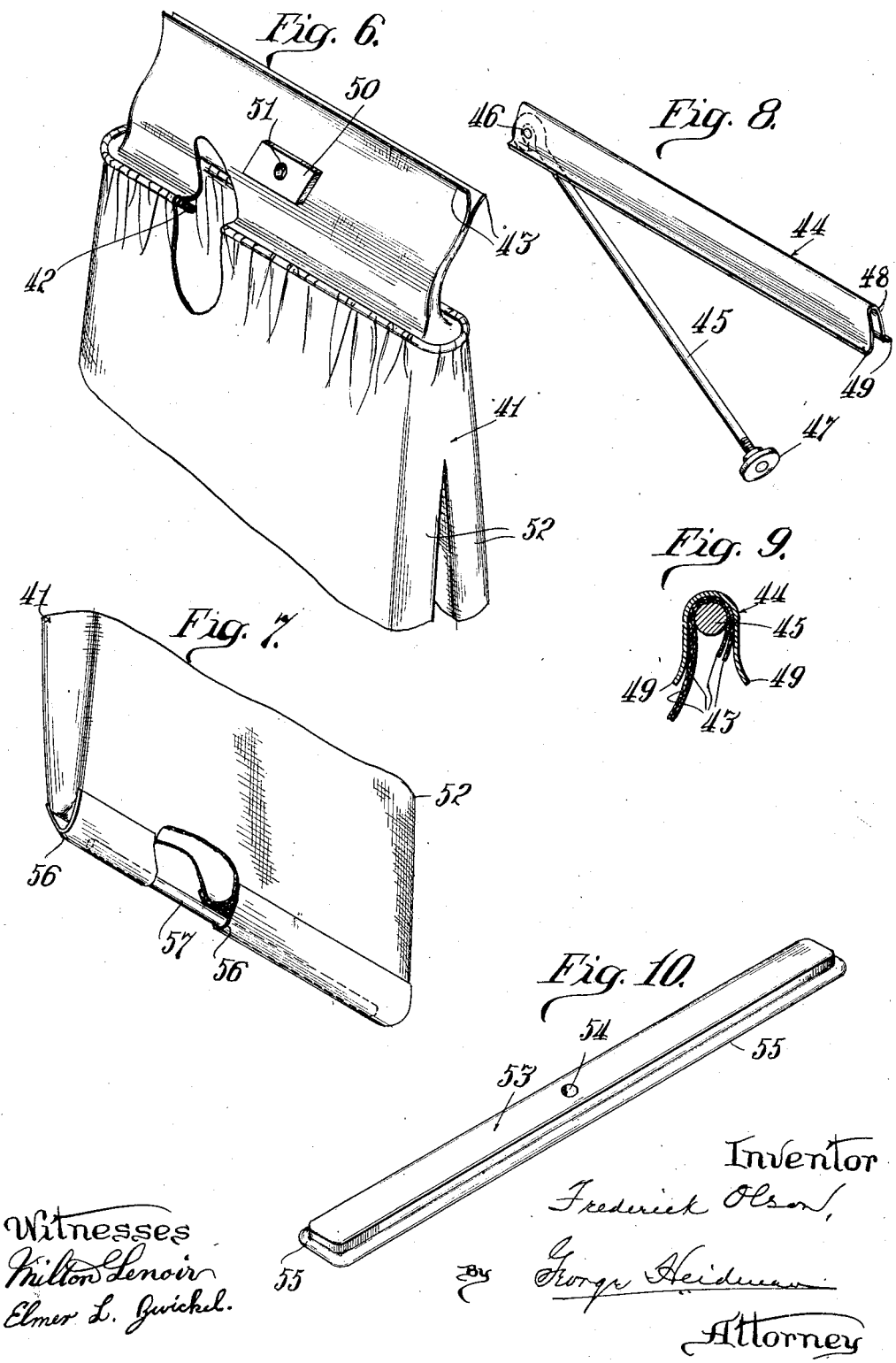

Patented Sept. 3, 1929.

1,726,758

UNITED STATES PATENT OFFICE.

FREDERICK OLSON, OF CHICAGO, ILLINOIS.

FILTERING MACHINE.

Application filed March 18, 1927. Serial No. 176,371.

My invention relates to a machine for filtering gasoline, varnish and other liquids; the invention pertaining to the pressure type of filter employing filtering elements involving bags of suitable fabric or cloth in conjunction with screens of predetermined mesh; and has for its object the provision of a construction whereby an increased filtering area is provided.

The invention involves a door or cover for the tank adapted to effect a pressure and gas-tight connection, together with means whereby the cover may be released and moved into suitable open position in order that proper access to the tank interior and the filtering elements therein may be had.

The invention also involves filter bags of novel construction and arrangement with means whereby a complete closure of the bags may be effected and all liquid introduced made to pass through the filter elements thereby ensuring a thorough filtering of the liquid.

The invention also involves means for suitably suspending the filter bags in position and also permitting the filter bags to be readily released from the holding means; the bags being of a construction which will permit a thorough cleaning thereof.

The objects and advantages of my invention will be more readily comprehended from the detailed description of the accompanying drawings, wherein—

Figure 1 is a sectional elevation of my improved machine.

Figure 2 is a top plan view thereof.

Figure 3 is a cross sectional view taken on the line 3—3 of Figure 2 of the upper end or top of the machine.

Figure 4 is a cross sectional view taken substantially on the line 4—4 of Figure 1 looking in the direction of the arrows.

Figure 5 is a sectional view of the upper end of the machine taken on the line 5—5 of Figure 2.

Figure 6 is a perspective view of the upper end of my improved filter bag with a portion broken away and shown in section.

Figure 7 is a perspective view of one part or bifurcation at the lower end of the filter bag.

Figure 8 is a perspective view of the bag closing means or clamp.

Figure 9 is a detail cross sectional view of the top end of the bag with clamp applied.

Figure 10 is a perspective view of a bag holding plate.

My improved machine, which is of the vertical pressure type, comprises an outer tank or shell 15, preferably cylindrical to withstand the pressure employed, and an inner wall or shell 16 in spaced relation with the outer shell. The inner shell is composed of separate abutting sections formed to provide a rectangular enclosure to permit easy mounting of the filtering elements. The two walls or shells are maintained in spaced relation and reenforced by suitable webs or ribs 17, see Figure 1, formed integral with the inner shell sections. The sections of the inner shell 16 are formed at their abutting edges so as to leave small passages for the fluid to seep through into the outer shell and for that reason I show the openings 16$^a$ (Figure 1) at the lower ends of the side sections where they rest on the bottom section; while the bottom ribs 17 are likewise provided with openings at 17$^a$ to permit the fluid to flow toward the center of the concaved bottom 18 of the outer shell 15. The outer shell 15 is provided with a concaved bottom 18 having a suitable outlet conduit 19. The inner shell sections 16 on two opposite sides are each provided with a series of grooves 20 extending from top to bottom, see Figure 4; the grooves in the opposite walls being in aligned relation in order to provide slideways for screens 21 of which a suitable number are employed commensurate with the size and capacity of the machine; the screens being maintained in comparatively predetermined close parallel relation with each other; the screens 21 extending from top to bottom of the inner shell 16. The machine, namely the outer shell, adjacent to the upper end thereof, is provided with an outlet conduit 22 through which the filtered gasoline or liquid under pressure discharges.

The upper end of the tank is formed with a suitable top portion or wall 23 having an opening provided with a closure member or cover 24 adapted to seat in the opening. The closure member or cover 24 is shown provided with a flanged periphery as at 25, see Figure 3, having a suitable gasket as at 26 to effect a proper pressure and gas-tight connection. The top 23 is shown provided with suitable standards or brackets 27 in which are mounted a shaft 28 to which cover-lifting arms 29 are secured and which have pivotal connection with the closure member or cover 24. The shaft 28 at one end is provided with a worm-gear 30 arranged in mesh with a worm-shaft 31 disposed substantially at right angles to shaft 28 and suitably mounted on the top of the machine in a bracket 32. The free or outer end of the worm-shaft 31 is provided with a suitable hand-crank 33, see Figure 2. The shafts 28 and 31 are mounted so as to be disposed beyond the opening in the top in which the closure member or cover 24 is seated, in order that a proper lifting or raising of the closure member 24 may take place. It is apparent, that upon proper rotation of the worm-shaft 31, through operation of crank 33, shaft 28 will be rotated and the arms 29, 29 oscillated upwardly, thereby lifting the closure member 24; while on the other hand a lifting or movement of the closure member without rotation of the worm-shaft is impossible. The arms 29 are shown with their outer or free ends provided with links 34 which in turn are pivotaly connected at 35 to an upstanding lip or flange 36 formed at the perimeter of the closure member 24.

The closure member or cover 24 is shown provided with laterally disposed extensions or lugs 37 adapted to strike or engage with the arms 29 when the mechanism is operated to raise the cover, thus causing the closure member or cover 24 to swing into a perpendicular position, as indicated in dotted lines in Figure 3, thereby causing a complete opening of the machine to be obtained, namely with the cover disposed beyond one side of the opening. This permits full access to the machine interior for manipulation and positioning of the filtering elements.

The cover 24 is provided with a manifold 38 shown disposed transversely thereof and having a suitably flexible conduit 39 which connects with a pump for forcibly introducing the liquid to be filtered. The manifold is also shown provided with a plurality of nipples 40, which preferably slightly taper toward the bottom and are disposed through openings in the cover 24; the nipples having fluid-tight relation with the cover.

My improved filtering elements or bags are indicated at 41; the upper portion being shown in detail in Figure 6. The upper open end is provided with an elastic element or coil spring 42 bound circumferentially into the bag. The top of the bag is provided with the flap portions 43 which are stitched together at the sides of the bag to provide a closed neck portion when the flap extension 43 has been provided with the clamp or closure means shown in Figure 8. This clamp consists of the channel member 44 of suitable metal in which a rod 45 is pivoted at one end as shown at 46; while the free end of the rod is threaded to receive a thumb-nut 47. The end of the channel member 44 is cut back toward the top as shown at 48 in order that the thumb-nut 47 may be screwed lengthwise of the rod 45 to a point beyond the lower projecting lips 49 of the channel members, thereby firmly holding the rod 45 in place. The neck 43 of the filter bag is placed across the rod 45, while the clamp is in the open position shown in Figure 8, namely with the upper end of the neck 43 across the rod 45, as shown in Figure 9. The rod, with the overlapping neck, is then forced upward into the channel member 44 and the thumb-nut 47 screwed inward of the rod into snug relation with the end of the channel member.

One of the necks 43 of the bag is provided with a suitable washer 50, such as leather and the like, which is provided with a tapered hole 51 for insertion over one of the nipples 40 of the manifold 38. The main portion of the bag, namely at a short distance below the top, is bifurcated as at 52 in order that the bifurcations 52 of the bag may be disposed on opposite sides of the vertically disposed screens 21; the bifurcations being of length to extend substantially to the bottom of the inner shell or tank 16, as shown in Figure 1.

In practice, the gasoline or other liquid to be filtered, is introduced by means of a suitable pump through conduit 39 into manifold 38 and thence by means of the respective nipples into all of the filter bags 41; the various bags being filled with the gasoline under pressure; thus causing the sides of the bifurcations of the bags to come into close relation with the screens 21.

In order to hold the bags 41 in place, I show each manifold outlet tube or nipple 40 provided with an elongated plate 53, shown in detail in Figure 10. Each plate 53 has an opening 54 for passage of a nipple 40 therethrough, sufficiently to permit the lower end of the nipple to pass into the opening 51, in the washer 50 of the bag. The holes 54 in the plates 53 are preferably made to conform with the slight taper of the nipples 40 in order that a snug holding relation may be obtained. The lower surface of the plates 53 are extended or laterally flanged beyond the normal edges of the plate as shown at 55.

As previously stated, the upper ends of the bags 41 are each provided with a coiled spring or elastic element 42 bound therein. This elastic portion of the bag is slipped onto the plate 53; the elastic element drawing the bag into snug relation with the main body portion of the plate 53 and therefore resting on the flanged lower portion or extension 55, thereby holding the bag in suspended position from its respective plate 53 as shown in Figure 5. This construction permits the bags to be readily removed when desired, while at the same time holding the bags in proper unfolded condition.

The bottom of each bifurcation of the bag is shown provided with a suitable pocket as at 56, secured beneath the main bottom of the bifurcation or bag-leg and open at the ends to receive a weight shown in the nature of a suitable rod 57, see Figure 7. This enables the easy introduction of the bifurcations between the closely placed screens 21; with the bifurcations straddling the screens as shown in Figure 5.

In practice, the fluid or gasoline is introduced, under suitable pressure, through conduit 39 into the manifold 38, after the bags have been suspendedly secured to the respective plates 53; the bifurcations of the bags being disposed on opposite sides of a screen. In order to induce proper filtration it is essential to keep the bifurcations apart by an intervening screen which also permits the filtered gasoline or other fluid to trickle down over the mesh to the bottom of the tank. It is for this reason that a screen is shown parallel with both sides of each bifurcation. As a result of my improved bags, a greater filtering area is provided and quicker operation is obtained.

With my construction, easy access to the tank interior is not only possible, but removal of the bags and screens for cleaning is also readily accomplished.

The filtered gasoline flows to the bottom of the outer shell and, being under pressure, is caused to flow out of conduit 22 to any suitable container; while any sediment that may pass through the filter bags will settle to the bottom of the outer shell, where it may be withdrawn through the clean-out drain tube 19.

The outer shell 15 is, of course, provided with suitable supports or standards as shown at 58 in Figure 1.

Upon operating the crank 33, the lid or closure member with the manifold may be lifted through the medium of the arm and link connection between said member and the shaft 28; the lugs on the member striking the arms and causing the lid to assume a vertical position to one side of the opening so as to provide an unobstructed opening.

In order to ensure the closure member being in pressure-tight relation, I prefer to employ a swinging bolt 59 pivotally secured to the top 23 of outer shell 15; the bolt being adapted to pass between the spaced lugs 37; the free end of the bolt being provided with a butterfly nut as at 60.

I have shown a convenient way of clamping or holding the bags closed, but it is apparent that any suitable means may be employed; and while the specific construction shown and described is believed to be the simplest and best construction, modifications in certain details may be made without, however, departing from the spirit of my invention.

What I claim is:

1. A filtering machine comprising an outer shell provided with an outlet at bottom and an outlet adjacent to the top, a sealed closure for the top of the shell, a manifold carried by said closure and having depending nipples in spaced relation, an inner shell arranged in spaced relation to the outer shell and formed to permit fluid to pass therefrom into the outer shell, a plurality of screens arranged in predetermined spaced parallel relation, and bifurcated filter bags secured to said nipples, with the bifurcations disposed on opposite sides of a screen.

2. A filtering machine comprising an outer shell provided with outlets, a closure member for the upper end of the shell, power means for operating said member and to hold the same in closed position against pressure, a manifold, carried by said closure member provided with depending outlets in spaced relation, an inner shell arranged in spaced relation to the outer shell and provided with fluid passages, a plurality of screens, and filter bags suspended intermediate of the screens.

3. A filtering machine comprising an outer shell provided with outlets, a closure member for said shell, shaft and gear mechanism for controlling said closure member, means whereby the member is caused to swing into vertical position when raised, a manifold located on top of the machine and provided with depending nipples, an inner shell arranged in spaced relation to the outer shell and having fluid passages, a plurality of screens arranged in parallel spaced relation, and filter bags, suspended from said nipples, intermediate of said screens.

4. A filtering machine comprising an outer shell provided with an outlet at bottom and adjacent the upper end, a closure member at the top of the shell, means for controlling said member, a plurality of inlet tubes carried by said closure member, an inner shell arranged in spaced relation to the outer shell and formed to permit the filtered fluid to pass into the outer shell, vertically disposed slideways in the inner shell, screens mounted in said slideways, bifurcated filter bags arranged in straddling relation to the screens, and means whereby said bags are removably clamped to the inner ends of said inlet tubes.

5. In a filtering machine, filter bags bifurcated beneath the upper ends, resilient means secured in the upper ends of the bags, the upper ends of the bags being provided with extended flaps having a tube receiving aperture.

6. In a filtering machine, a bifurcated filter bag, resilient means encircling the upper end of the bag, a foldable flap portion secured to the upper end, a tube receiving washer secured in one side of said flap portion, a weight-holding pocket at the bottom of each bifurcation, and means whereby said flap portion may be clamped in closed condition.

7. In a filtering machine, an outer shell provided with an outlet at bottom and an outlet in the side adjacent to the top, a closure member for the top of said shell provided with a fluid receiving chamber having a plurality of depending tubes, an inner shell composed of separate sections arranged to permit fluid to pass into the outer shell and provided with outwardly disposed ribs whereby said inner shell sections are maintained in spaced relation to the outer shell, two opposite sections of the inner shell having vertically arranged slideways on the inner faces, and foraminated elements slidably mounted in the slideways and disposed transversely of the inner shell in parallel relation.

8. In a filtering machine, an outer shell provided with an outlet adjacent to the top and provided with a drain in the bottom, a cover adapted to fit into the opening in the top of the shell and flanged to provide a fluid sealing relation therewith, a shaft disposed transversely on said shell and provided with arms having pivotal connection with said cover, a crank-shaft having worm and gear connection with said first shaft, means whereby said cover is tilted into vertical position when said shafts are operated to lift said cover, a fluid receiving manifold carried by said cover and provided with nipples disposed downwardly through said cover, a shouldered plate secured to the inner end of each nipple, and filter bags each formed at top to have binding relation with one of said shouldered plates.

9. In a filtering machine, an outer cylindrical shell, a cover adapted to fit into the opening in the top of the shell and form fluid-sealing relation therewith, crank-shaft mechanism for controlling said cover, a fluid-receiving manifold carried by said cover and provided with nipples disposed downwardly through said cover, the inner ends of the nipples being each provided with an elongated laterally disposed extension, and filter bags, each provided at top with an encircling resilient element whereby said bags are removably held on said laterally disposed extensions of the nipples.

10. In a filtering machine, an outer shell, an inner shell spacedly mounted in the outer shell to provide a fluid passage therebetween, two opposite sides of the inner shell being provided with vertically disposed aligned slideways, screens slidable in said slideways, a cover for said outer shell arranged in fluid-tight relation therewith, a plurality of inlet nipples disposed through said cover, with their inner ends each provided with an elongated lateral extension, filter bags having tops provided with nipple receiving openings, and means whereby the tops of the bags are held onto said extensions.

11. In a filtering machine, an outer shell, an inner shell spacedly mounted in the outer shell to provide a fluid passage therebetween, screens arranged in spaced relation within the inner shell, a closure for the top of the outer shell, fluid introducing tubes disposed through the top of the outer shell, bifurcated filter bags with tube-receiving openings in the top, each bag straddling a screen with the bifurcations separated with a screen therebetween, and means whereby the tops of the bags are held suspended from the tubes.

12. In a filtering machine, an outer shell, an inner shell spacedly mounted in the outer shell to provide a fluid passage therebetween, vertically arranged slideways on opposite sides of the inner shell, screens slidable in said slideways, a cover for said outer shell provided with fluid introducing tubes extending therethrough, a rocker-shaft provided with a pair of arms pivotally connected with said cover, an operating shaft having worm and gear connection with said rocker-shaft, and filter-bags suspended from said tubes and disposed intermediate of said screens.

13. In a filtering machine, a tank provided at top with a plurality of fluid introducing members, a plurality of vertically disposed screens arranged in spaced relation and extending transversely of the tank, filter bags suspendedly mounted between the screens and having gasketed inlet openings at the upper ends, and means disposed transversely of the bags for closing the open portion of the bags against the pressure of the fluid introduced into the bags.

FREDERICK OLSON.